United States Patent [19]
Albrecht et al.

[11] Patent Number: 4,512,805
[45] Date of Patent: Apr. 23, 1985

[54] VALVE METAL POWDER DOPED WITH BORON

[75] Inventors: Wolf-Wigand Albrecht, Bad Harzburg; Uwe Papp, Goslar; Dieter Behrens, Bad Harzburg, all of Fed. Rep. of Germany

[73] Assignee: Hermann C. Starck Berlin, Berlin, Fed. Rep. of Germany

[21] Appl. No.: 620,109

[22] Filed: Jun. 13, 1984

Related U.S. Application Data

[63] Continuation of Ser. No. 416,194, Sep. 9, 1982, abandoned.

[30] Foreign Application Priority Data

Oct. 9, 1981 [DE] Fed. Rep. of Germany ....... 3140248

[51] Int. Cl.³ .......................... C22C 1/08; H01G 9/05; B22F 1/00; B22F 9/24
[52] U.S. Cl. .................... 75/244; 75/0.5 BB; 75/254; 75/84.4; 361/305; 361/322; 419/2; 419/10; 419/12; 419/34; 419/46; 428/550
[58] Field of Search ................. 75/0.5 BB, 84.4, 244, 75/251, 254; 361/305, 322; 419/2, 10, 12, 31–34, 46; 428/550

[56] References Cited

U.S. PATENT DOCUMENTS

| 2,769,114 | 10/1956 | Williams | 75/244 X |
| 3,470,030 | 9/1969 | Lindholm et al. | 75/244 X |
| 3,723,838 | 3/1973 | Kumagai | 361/305 X |
| 4,009,007 | 2/1977 | Fry | 361/305 X |
| 4,084,965 | 4/1978 | Fry | 75/0.5 BB X |
| 4,141,719 | 2/1979 | Hakko | 419/13 X |
| 4,141,720 | 2/1979 | Vartanian | 75/84.4 X |
| 4,229,217 | 10/1980 | Hahn | 419/13 X |
| 4,231,790 | 11/1980 | Hahn et al. | 75/0.5 BB |
| 4,356,028 | 10/1982 | Bates | 75/0.5 BB X |

*Primary Examiner*—Ben R. Padgett
*Assistant Examiner*—Matthew A. Thexton
*Attorney, Agent, or Firm*—Ladas & Parry

[57] ABSTRACT

A process for the production of valve metal powder, which is doped with boron or boron compounds, for electrolytic capacitors having a low relative leakage current and a high specific charge. The doping with boron or boron compounds in amounts of up to 0.5 percent by weight, relative to the metal content, can take place either during the production of the metal powder or the green valve metal anodes.

18 Claims, No Drawings

VALVE METAL POWDER DOPED WITH BORON

This is a continuation of Ser. No. 416,194 filed on Sept. 9, 1982, now abandoned.

The present invention relates to doping valve metal powder or the raw materials thereof with boron or boron compounds for the purpose of improving the electrical properties, especially the specific charge and relative leakage current of valve metal electrolytic capacitors which or produced from the aforesaid valve metal powder.

In the past the doping, for example, of tantalum metal, for capacitor purposes for the purpose of improving the specific electric properties of dry electrolytic capacitors produced therefrom was carried out with different admixtures. In the course of processing the doping of tantalum can take place during different processing stages, namely:

(1) during the production of tantalum metal powder from raw materials which are converted to a metallic phase by reduction;

(2) during a powder-metallurgy processing of tantalum metal into sintered anodes, or (3) by treating the sintered anode by means of thermochemical or wet chemical processes.

In most cases such desired "impurities" are added in definite amounts together with doping agents to the tantalum metal powder prior to the powder-metallurgical processing. Thus, for example, it appears from the German Published Specification No. 24 05 459 that addition of molybdenum to the tantalum powder substantially reduces the temperature dependency of the electrical capacity.

The use of nitrogen as a doping agent for tantalum thin-layer capacitors is described in German Laid Open Specification No. 23 00 813 (U.S. Pat. No. 3,723,838 granted Mar. 27, 1973) Phosphorus must also be mentioned as a further doping element for tantalum for use as a valve metal for capacitors; the phosphorus in the form of compounds thereof is either added to the metallic tantalum powder prior to the sintering of anodes, as described in German Laid Open Specification No. 26 16 367 (U.S. Pat. No. 4,009,007 granted Feb. 22, 1977), or is added in the form of phosphorous compounds to the raw material, namely $K_2TaF_7$, in the course of the production of the tantalum powder, as is shown in pending German patent application No. P 30 05 207.4 (U.S. Ser. No. 231,991 filed Feb. 6, 1981 of Hähn).

However, if phosphorus is added in some form to the tantalum either before or after the production of metal, this doping agent has a disadvantageous effect on the behavior of the leakage current of the tantalum capacitor insofar as the electrolytic formation of the P-doped tantalum sintering anode takes place at temperatures below 85° C. In the large-scale production of capacitors, however, the formation at a high temperature is an undesired expenditure of technique and energy.

In order to permit a better leakage current behavior, certain amounts of boric acid are added to the forming electrolyte, which usually consists of diluted phosphoric acid, as described in German Laid Open Specification No. 26 38 796. However, since the metal side of the formed dielectric of the tantalum anode is not affected by this step, there is no boron-doping of tantalum discussed in the aforementioned German Laid Open Specification.

It has now been unexpectedly found that by replacing phosphorus or the compounds thereof as a doping agent for tantalum metal with boron or boron compounds, such as boric acid or the salts thereof, it is not only the leakage current behavior ($\mu A/mC$) which is improved in a desirable way, but, moreover, the specific charge of the tantalum capacitors (mC/g) also is considerably increased. This specific charge increase clearly goes beyond that which is achieved by doping the tantalum with phosphorus. Preferably, the boron portion for doping should amount to up to 0.5 percent by weight based on boron, especially from 0.0005 to 0.5 percent by weight. The measure of doping the tantalum with boron thereby does not only extend to an addition of boron to the tantalum metal powder prior to the powder-metallurgical production of the tantalum anode, but is also fully effective if, prior to its refining, one of the raw materials, for example, $K_2TaF_7$, is doped with boron compounds in a definite way; the latter can, for example, be carried out in an analogous way to the doping with phosphorus according to German patent application No. P 30 05 207.4 (U.S. Ser. No. 231,991 filed Feb. 6, 1981 of Hähn).

The execution of the doping steps is further described by means of some examples, whose selection, however, does not represent a limitation as to further possibilities. In general one can achieve the object of the invention, aside from what is shown in the following examples, if one provides for introducing boron in some form, at some processing stage in a desired amount, into the valve metal from which a capacitor electrode (anode) is then manufactured. Moreover, the effect according to the invention will also apply if, for example, compacts of valve metal powder, with or without being presintered, are soaked with a boron-containing solution and eventually exposed to the main sintering step.

Furthermore, it is possible to dope a valve metal anode during a sintering process by adding definite amounts of gaseous boron compounds, for example, borane, into a sintering furnace and bringing about a deposition of boron on the metal surfaces.

Moreover, it appears that in the case of other valve metals, such as, for example, niobium or titanium, a boron content of the same order of magnitude as in the invention brings about analogous effects. This equivalence is especially obvious in the case of niobium, which is very similar to tantalum in many of its properties. A test for substantiating this assumption is described following Examples 1 to 4.

As valve metals there may be taken included especially tantalum and the alloys thereof as well as other metals of the group IVb, Vb and VIb of the Periodic System and the alloys thereof (see also *Oxides and Oxide Films*, Vol. 1, edited by John W. Diggle, Marcel Dekker, Inc., New York, 1972, pages 94 and 95).

EXAMPLE 1

In the course of the production process of potassium tantalum fluoride there was added boron in the form of $H_3BO_3$ in amounts of from 0.005 to 0.5 percent by weight, relative to the tantalum content, to an $H_2TaF_7$ solution prior to precipitating the double salt with potassium ions. The potassium tantalum fluoride, obtained after precipitating with a potassium salt, contained in the dry state after separation of the mother lye (liquor) such amounts of boron that after the metallothermal reduction of the double salt about 20 to about 2500 ppm boron was analyzed in the metallic tantalum.

EXAMPLE 2

A further preferred embodiment of doping with boron consists in adding boron, preferably as boric acid $H_3BO_3$, while re-crystallizing crude postassium tantalum fluoride. This re-crystallization takes place by dissolving the crude salt in 2N hydrofluoric acid under heating the solution to 90° to 100° C. The addition of boric acid takes place prior to cooling and crystallizing the purified potassium tantalum fluoride. If, for example, one adds 150 kg of $K_2TaF_7$ (crude) to 2 $m^3$ of a 2N HF solution and heats while stirring to 100° C., and adds respectively 20 grams, 200 grams, or 2000 grams of boric acid ($H_3BO_3$) to the clear solution, one obtains therefrom, after centrifuging and drying, boron-doped $K_2TaF_7$ from which tantalum metal powder comprising 6 or 125 or 2100 ppm boron is obtained after the metallothermal reduction.

EXAMPLE 3

A further possibility for carrying out the process according to the invention offers itself on the occasion of utilizing the process of production according to German patent No. P 2517180 (U.S. Pat. No. 4,231,790 granted Nov. 4, 1980) for tantalum metal powder. In the course of this process boron in the form of $KBF_4$ was added to the starting mixture of $K_2TaF_7$, alkali metal and alkali halides. During the following reduction of tantalum and after separation of the pure metal from the resulting salt compounds, boron appeared in nearly total yield as a constituent of the tantalum metal powder.

For example, boron was added to the starting mixtures as $KBF_4$ in amounts of 10, 120, 500, and 1200 ppm relative to the tantalum content from which there resulted tantalum powders as final products comprising boron contents of 8, 112, 480, and 1020 ppm.

EXAMPLE 4

A further embodiment of doping tantalum powder with boron in compliance with the invention proceeded from metallic tantalum.

Boron was added as an "amorphous" element in very fine powdery form to the tantalum powder by intensive stirring prior to the thermal agglomeration. Practically, a diluted aqueous or organic suspension of the boron powder was trickled into the mixable metal powder while stirring under slight heating and evaporating the solvent. After a homogeneous distribution of the boron in the powder mass, the boron can be introduced into the tantalum metal by diffusion during a subsequent temperature treatment in vacuo or under inert gas.

In that way there were produced samples which had been adjusted to boron contents in the tantalum powder comprising 50, 500, 1000 and 5000 ppm boron. In the agglomerated Ta powder there were found analytical contents of 42, 476, 952 and 4810 ppm boron.

In addition to the boron-doping of tantalum powder prior to the agglomeration carried out according to Example 4, it is also possible, as already earlier mentioned, to dope agglomerated tantalum powder, i.e. after the agglomeration and before the powder-metallurgical production of the sintering anodes.

To evaluate the advantages of the products obtained in the Examples in conformity with the invention, test anodes were produced from a few selected experimental samples; after sintering and forming the test andoes were electrically tested.

The results of these electric test measuremens are compiled in the following Tables. Compared are the test data of such test anodes, which have been produced under the same test conditions, but from tantalum powder doped with phosphorus according to the prior art. Besides, there were also tested anodes which were free from doping agents; thus, such which contained neither boron nor phosphorus.

The following constant test conditions were observed for all the tested samples:
Weight of the green compact: 0.4 g
Pressing density: 4.0 $g/cm^3$
Sintering conditions: 1600° C. (measured optically), 30 minutes
Formation electrolyte: 0.01% $H_3PO_4$
Formation current: 35 mA/g
Measuring electrolyte: 10wt. % $H_3PO_4$
Forming time: 120 minutes (after reaching the final voltage).

The selection of variable test conditions can be understood from Tables 1 and 2; it was as follows: the forming voltage $V_F$, the forming temperature $T_F$, and the content of doping agents in the tantalum, i.e. (a) boron, (b) phosphorus, (c) no additive.

TABLE 1

Dependence of the electric properties of B-doped tantalum anodes on the boron content of tantalum powder
Selection of variable parameters: forming temperature: 60° C., forming voltage: 100 volt.
Test Readings:

| Boron content in the Ta-powder (in ppm) | 8 | 42 | 125 | 480 | 952 | 4810 | un-doped | P-doped (500 ppm) |
|---|---|---|---|---|---|---|---|---|
| Specific charge (mC/g) | 14.10 | 14.27 | 14.55 | 14.70 | 14.78 | 14.92 | 9.52 | 13.7 |
| Specific leakage current (μA/g) | 3.0 | 3.0 | 3.2 | 4.0 | 5.0 | 10.4 | 2.5 | 1680 |
| Relative leakage current (μA/mC) | 0.21 | 0.21 | 0.22 | 0.27 | 0.34 | 0.70 | 0.26 | 122.6 |

TABLE 2

Dependence of the electric properties of boron-doped tantalum anodes on the temperature of the forming electrolyte
Selection of variable parameters: boron content of the Ta powder: about 500 ppm; forming voltage: 100 volt.
Comparison with P-doped Ta powder: the test results are in parentheses.
P-content: 500 ppm.

| Bath temperature | 30° C. (+1° C.) | | 60° C. (±2° C.) | | 90° C. (±2° C.) | |
|---|---|---|---|---|---|---|
| | a | (b) | a | (b) | a | (b) |

TABLE 2-continued

Dependence of the electric properties of boron-doped tantalum anodes on the temperature of the forming electrolyte
Selection of variable parameters: boron content of the Ta powder: about 500 ppm; forming voltage: 100 volt.
Comparison with P-doped Ta powder: the test results are in parentheses.
P-content: 500 ppm.

| | | | | | | |
|---|---|---|---|---|---|---|
| Specific charge (mC/g) | 15.8 | (15.0) | 14.7 | (13.7) | 12.5 | (12.0) |
| Specific leakage current ($\mu$A/g) | 4.8 | (4.6) | 4.0 | (1680) | 3.5 | (4.0) |
| Relative leakage current ($\mu$A/mC) | 0.30 | (0.3) | 0.27 | (128) | 0.28 | (0.33) |

EXAMPLE 5

Analogously as in Example 4 agglomerated niobium powder (capacitor quality) was mixed with 500 ppm amorphous boron and electrically tested in comparison to undoped niobium powder.

Test conditions:
Weight of the compact: 0.8 g
Pressing density: 4.0 g/cm$^3$
Sintering condition: 1650° C., 30 minutes
Formation electrolyte: 0.01% H$_3$PO$_4$
Formation current: 25 mA/g
Measuring electrolyte: 10% H$_3$PO$_4$

| Test results: | undoped | doped with 500 ppm boron |
|---|---|---|
| Specific capacitance (mC/g) | 6.5 | 7.1 |
| Specific leakage current ($\mu$A/g) | 2.7 | 2.5 |
| Relative leakage current ($\mu$A/mC) | 0.41 | 0.39 |

EVALUATION OF THE TEST READINGS

To explain the advantageous effect of the measure according to the invention, a limited selection was made from a plurality of test results. These results show that through the known doping of tantalum with phosphorus it is indeed possible to achieve a quite advantageous increase of the specific charge with low leakage currents of a tantalum capacitor when employing high forming temperatures (85°–90° C.) while forming the anode. At low forming temperatures (<85° C.), however, the P-doping is detrimental to the behavior of the leakage current to such an extent that the remarkable advantage of increase of capacitance is annuled and is, therefore, meaningless in practice. (see Table 1, column 8). Owing to an addition of boron or boron compounds in accordance with the invention, said disadvantage is removed and, moreover, a further advantage of specific charge is achieved (see Table 1, columns 1–6). It will be noted that the kind of doping with boron, as shown in the Examples in different ways, has no noticeable effect on the order of magnitude of the test data. The measured differences were within the scope of tolerances specified by the test methods.

In the case of doping niobium metal powder with boron according to Example 5, it must be concluded in analogy to tantalum that according to the invention, by introducing boron into the niobium metal in any form during any process step, both the specific charge and the relative leakage current of a niobium capacitor produced therefrom are evidently improved.

We claim:
1. In a process for producing an agglomerated valve metal powder for use in electrolytic capacitors having a low relative leakage current and a high specific charge, wherein the valve metal powder is heated under vacuum or under inert gas until an agglomerated state of said valve metal powder is achieved, the improvement which comprises admixing boron or a boron compound in amount up to 0.5 percent by weight, relative to the metal content, with the valve metal powder before thus thermally agglomerating said powder.

2. Valve metal powder produced by the process according to claim 1.

3. In a process for producing a sintered valve metal anode which comprises forming a green valve metal anode with valve metal powder and sintering said green valve metal anode, the improvement which comprises adding a boron compound in liquid or gaseous phase to the green valve metal anode prior to or during sintering so that in the sintered final product boron of up to 0.5 percent by weight, relative to the metal content, is present in the metallic phase.

4. A sintered valve metal anode produced by the process of claim 3.

5. In a process for producing a doped valve metal powder for use in electrolytic capacitors having a low relative leakage current and a high specific charge, wherein a doping agent is added to raw material for producing the valve metal and said raw material is then processed to produce the valve metal in elemental and powdered form, the improvement which comprises during the production of said valve metal powder admixing boron or a boron compound as the doping agent with the raw material for producing said valve metal powder in an amount of up to 0.5 percent by weight relative to the total metal content of the resulting powder.

6. Process according to claim 5, in which the boron or compound of boron is used in an amount so as to be present in an amount of at least 0.0005 percent by weight of the total metal content of the resulting powder.

7. Valve metal powder produced by the process according to claim 5.

8. A sintered anode produced from the valve metal powder according to claim 7.

9. A process according to claim 5, wherein during the production of the boron-doped valve metal, the boron or boron compound is added in an amount of up to 0.5 percent by weight, relative to the metal content, to one of one or more auxiliary agents participating in a reduction process for producing said valve metal.

10. Process according to claim 9, in which the boron compound is KBF$_4$.

11. A valve metal powder produced by the processing according to claim 10.

12. A process according to claim 5, wherein tantalum and/or niobium or alloys thereof are produced and is used as valve metals.

13. A process according to claim 12, wherein boron-doped $K_2TaF_7$ is employed as the raw material for the production of B-doped tantalum metal powder.

14. Valve metal powder produced by the process according to claim 13.

15. A process according to claim 13, wherein boron is added as a doping agent in the form of soluble compounds thereof to a solution from which $K_2TaF_7$ is recovered prior to the crystallization and precipitation thereof.

16. Valve metal powder produced and by the process according to claim 15.

17. Process according to claim 15, in which the boron compound is boric acid.

18. A valve metal powder produced by the process according to claim 17.

* * * * *